(12) United States Patent
Horie et al.

(10) Patent No.: US 7,264,902 B2
(45) Date of Patent: Sep. 4, 2007

(54) BATTERY SYSTEM WITH EXCELLENT CONTROLLABILITY FOR TEMPERATURE

(75) Inventors: Hideaki Horie, Kanagawa-ken (JP); Yasuhiko Ohsawa, Kanagawa-ken (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 251 days.

(21) Appl. No.: 10/173,612

(22) Filed: Jun. 19, 2002

(65) Prior Publication Data
US 2003/0008205 A1    Jan. 9, 2003

(30) Foreign Application Priority Data
Jul. 4, 2001    (JP)    .......................... P2001-203358

(51) Int. Cl.
*H01M 10/50* (2006.01)
*H01M 6/18* (2006.01)

(52) U.S. Cl. ...................................... 429/120; 429/304
(58) Field of Classification Search ................ 429/71, 429/120, 231.95, 148
See application file for complete search history.

(56) References Cited

U.S. PATENT DOCUMENTS

| | | | | |
|---|---|---|---|---|
| 2,273,244 A | * | 2/1942 | Ambruster | 429/71 |
| 4,098,962 A | * | 7/1978 | Dennison | 429/72 |
| 4,383,013 A | * | 5/1983 | Bindin et al. | 429/112 |
| 4,395,468 A | * | 7/1983 | Isenberg | 429/31 |
| 4,578,324 A | * | 3/1986 | Koehler et al. | 429/26 |
| 5,338,622 A | * | 8/1994 | Hsu et al. | 429/26 |
| 5,460,904 A | * | 10/1995 | Gozdz et al. | 429/316 |
| 5,478,667 A | * | 12/1995 | Shackle et al. | 429/120 |
| 5,569,552 A | * | 10/1996 | Rao et al. | 429/72 |
| 5,985,483 A | * | 11/1999 | Verhoog et al. | 429/120 |
| 6,146,783 A | * | 11/2000 | Brohm et al. | 429/62 |

FOREIGN PATENT DOCUMENTS

| | | | |
|---|---|---|---|
| JP | 6-283213 | | 10/1994 |
| JP | 7-57788 | | 3/1995 |
| JP | 7-201371 | * | 8/1995 |
| JP | 7-282841 | | 10/1995 |
| JP | 9-106831 | | 4/1997 |
| JP | 10-003951 | | 1/1998 |
| JP | 10-255727 | * | 9/1998 |
| JP | 10-340740 | | 12/1998 |
| JP | 2000-260474 A | | 9/2000 |
| JP | 2001-23702 | | 1/2001 |
| JP | 2001-23703 A | | 1/2001 |
| JP | 2001-143769 A | | 5/2001 |
| WO | WO94/02969 | * | 2/1994 |

OTHER PUBLICATIONS

Japanese Office Action issued in corresponding Japanese Patent Application No. 2001-203358, dated Jan. 30, 2007.

* cited by examiner

*Primary Examiner*—Stephen Kalafut
*Assistant Examiner*—Julian Mercado
(74) *Attorney, Agent, or Firm*—McDermott Will & Emery LLP

(57) ABSTRACT

A battery system of the present invention includes one or more cell groups, each having a positive electrode, a negative electrode and a solid electrolyte layer, and one or more heat mediating structures adjacent to the cell groups. The cell groups and the heat mediating structures are alternately stacked. A solid electrolyte is applied to the electrolyte layer. The respective cell groups have a thin plate shape, and adjacent thereto, the heat mediating structures are provided.

12 Claims, 7 Drawing Sheets

BATTERY SYSTEM WITH EXCELLENT CONTROLLABILITY FOR TEMPERATURE

BACKGROUND OF THE INVENTION

1. Field of the Invention

The present invention relates to a battery system such as a lithium polymer secondary battery, and more specifically, to a battery system excellent in controllability for temperature thereof.

2. Description of the Related Art

In order to decrease a load to the global environment and an influence to the global warming, interest in an electric vehicle or a hybrid vehicle has been enhanced. As a power supply of such a vehicle, a demand for a high-performance secondary battery has been increased.

As such a secondary battery for the electric vehicle or the hybrid vehicle, a lithium ion battery, a nickel hydrogen battery or the like has been proposed in consideration for energy density, a lifetime, an output and the like. In a high output type of the secondary battery described above, an output of 800 W/kg or more is obtained at room temperature.

SUMMARY OF THE INVENTION

At low temperature, internal resistance of the lithium ion battery or the nickel hydrogen battery is significantly increased, and the obtained output is lowered. In the case of using the battery in winter or in a cold district, since a battery system is at low temperature at an initial stage of operation, there has been a problem that a sufficient output is not obtained until the temperature is elevated.

As a method for solving the above problem, heating of the battery by external means at the starting time can be conceived. However, since the proposed secondary battery has a large heat capacity, there have been problems that temperature elevation thereof is not easy and rapid temperature control therefor is difficult.

A liquid electrolyte is applied to the proposed secondary battery described above. If this electrolytic solution leaks, then a positive electrode and a negative electrode are short-circuited. Accordingly, the electrolytic solution must be liquid-tightly sealed for each cell to be prevented from a leakage. Moreover, in order to obtain a large output, a large number of cells are accumulated, and further, the accumulated cells are accommodated in a case. Therefore, the proposed secondary battery is inevitably enlarged and will have a large heat capacity. Hence, even if the external means for heating the battery is introduced, the rapid temperature elevation and temperature control have been difficult.

The present invention was made in order to solve the foregoing problems. An object of the present invention is to provide a battery system, which is easily subjected to the temperature control, and particularly, can be heated up rapidly at the starting time.

A battery system according to the present invention includes one or more cell groups, each including a positive electrode, a negative electrode and a solid electrolyte layer, and one or more heat mediating structure adjacent to the cell groups. The cell groups and the heat mediating structures are alternately stacked.

To the respective cells, a solid electrolyte is applied. The respective cell groups are formed in a thin plate shape, and adjacent thereto, the heat mediating structures are provided. Here, the term "adjacent" means that two things are in contact with each other without interposing a medium inhibiting heat conduction therebetween. Moreover, the term "heat mediating structure" means a structure including a heat medium flowing therein or a solid good heat conductor therein, to which external temperature controlling means is coupled for achieving the rapid heat conduction. The concrete example of the heat mediating structure will be described later.

To the battery system of the present invention, the solid electrolyte is applied, whereby means for liquid-tightly sealing the cell is omitted. The liquid-tightly sealing means is omitted, whereby each cell is miniaturized to decrease the heat capacity, and each cell is formed in the thin plate shape to achieve improvement of heat conduction efficiency. Moreover, the heat mediating structure is inserted between the cells, whereby improvement of the heat conduction from the external temperature controlling means is achieved. By adopting such a configuration, it is made possible to heat or cool the battery system rapidly. Particularly, it is made possible to elevate the temperature of the battery system rapidly at the starting time.

DETAILED DESCRIPTION OF THE PREFERRED EMBODIMENT

Description will be made for a battery system according to a first embodiment of the present invention with reference to FIGS. 1A to 2.

Figure 1A:
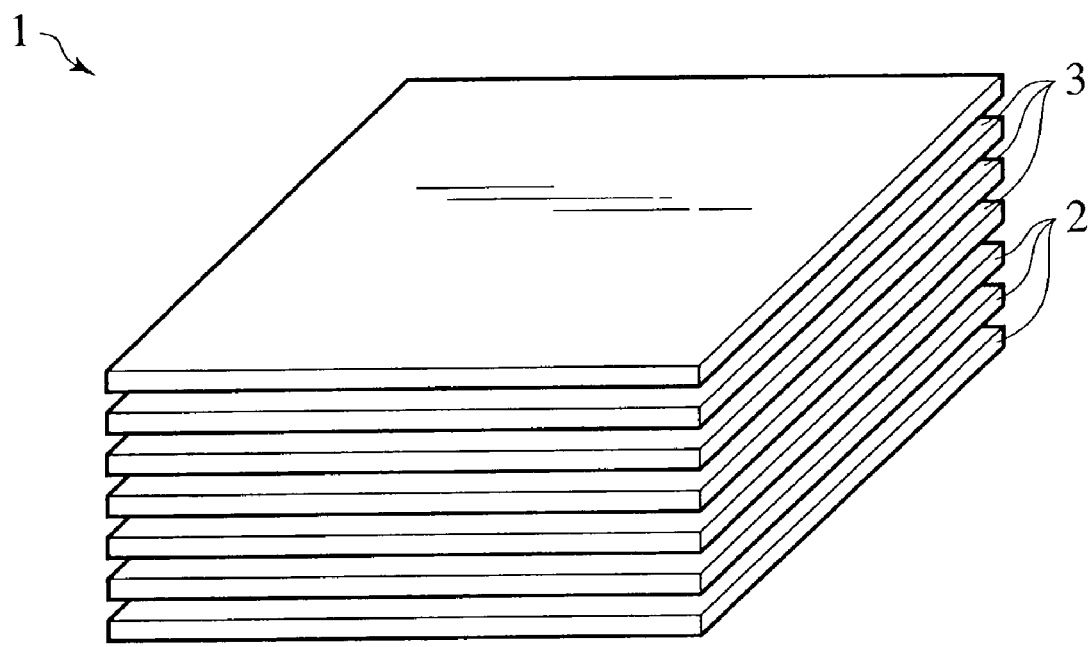
FIG. 1A is a perspective view of a fundamental configuration of a battery system according to a first embodiment of the present invention.
Figure 1B:
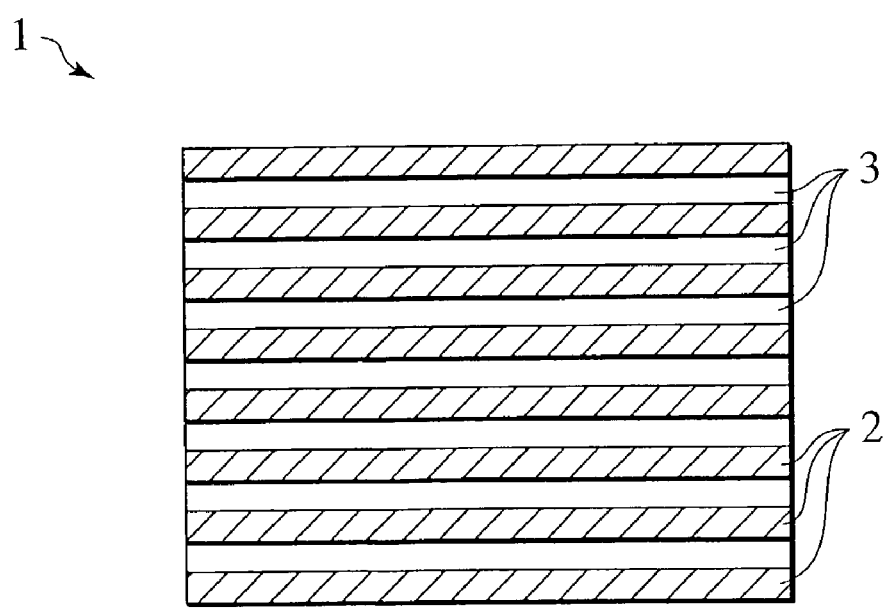
FIG. 1B is a cross-sectional view of the fundamental configuration of the battery system according to the first embodiment of the present invention.

As shown in FIGS. 1A and 1B, a battery system 1 includes a plurality of cell groups 2 and a plurality of heat mediating structures 3, which are alternately stacked. Each of the cell groups 2 is formed in a thin plate shape, and heated and cooled effectively by the heat mediating structures 3.

Figure 2:
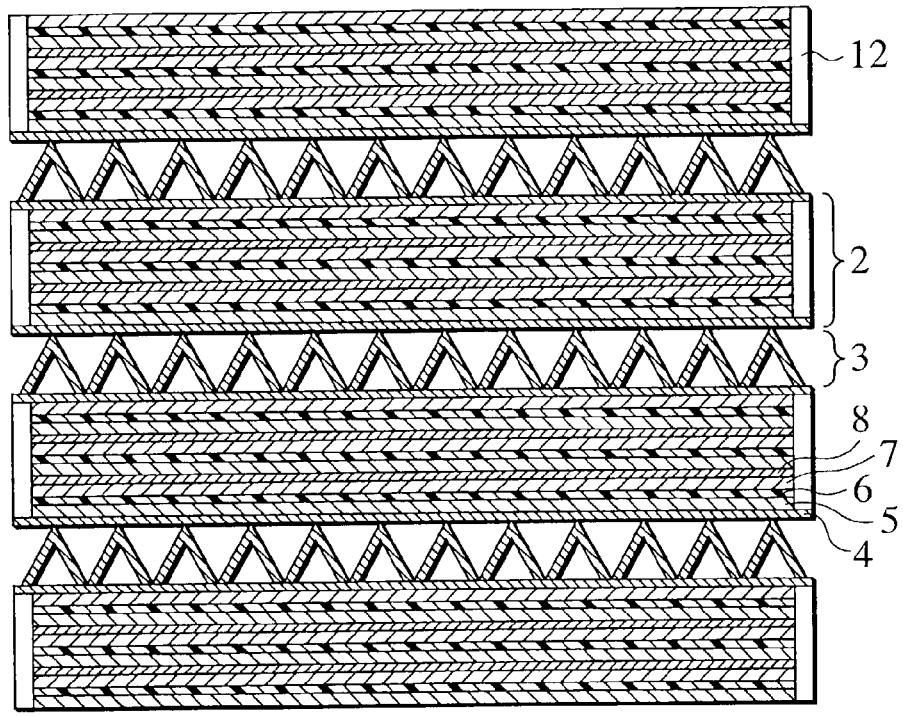
FIG. 2 is an enlarged cross-sectional view of the battery system according to the first embodiment of the present invention.

As shown in FIG. 2, the cell group 2 includes a plurality of negative electrodes 5, a plurality of solid electrolyte layers 6 and a plurality of positive electrodes 7. The negative electrodes 5, the solid electrolyte layers 6 and the positive electrodes 7 are stacked to constitute a unit cell. A plurality of the unit cells are stacked with electron conducting layers 8 sandwiched there among, thus constituting the cell group 2. Preferably, each cell group 2 is provided with insulating layers 12 on sides thereof. Desirably, the cell group 2 is thin in order to reduce the heat capacity to enable rapid temperature control thereof, and preferably, a thickness of the cell group 2 is set at 15 mm or less. For the same reason, a thickness of the unit cell is preferably set at 600 mm or less.

A material of the negative electrode 5 is selected in accordance with a type of the battery. In the case of constituting the battery as a lithium polymer secondary battery, graphite, hard carbon, lithium titanate, soft carbon and metallic lithium can be exemplified as the material of the negative electrode 5. Preferably, the material is selected from the group consisting of graphite, hard carbon and lithium titanate. In the case of applying the materials described above, since a curve of an output voltage is changed depending on a discharge rate, a residual battery level can be determined, thus making it possible to control charge/discharge thereof properly.

The solid electrolyte layer 6 mediates ion exchange between the negative electrode 5 and the positive electrode 7, which follows a battery reaction. A material of the solid electrolyte layer 6 is a substance with ion conductivity but without electron conductivity, which is a polymer ion conducting material, an inorganic ion conducting material and the like. The polymer ion conducting material means a polymer material with the ion conductivity, in which ethylene-propylene copolymer and polyethylene oxide can be exemplified. The inorganic ion conducting material means an inorganic material with the ion conductivity, in which sulfur glass, perovskite such as titanium oxide and the like can be exemplified. The solid electrolyte layer 6 expresses the ion conductivity by further dispersing an electrolytic compound into the material. As the electrolytic compound, $LiN(CF_3SO_2)_2$, $LiN(C_2F_5SO2)_2$, $LiN(CF_2SO_3)_2$, $LiPF_6$, $LiCF_3SO_3$, $LiBF_4$, $LiNH_2$, $LiF$, $LiCl$, $LiBr$, $LiI$, $LiCN$, $LiClO_4$, $LiNO_3$, $C_6H_5COOLi$, $NaCl$, $NaBr$, $NaF$, $NaI$, $NaClO_4$ and $NaCN$ can be exemplified. In consideration for various battery characteristics, a positive charge carrier is desirably lithium ions. Desirably, the electrolytic compound is evenly dispersed into the solid electrolyte layer 6. In this case, a solid electrolytic compound may be dispersed as it is, or may be dissolved in a suitable solvent and then mixed with the solid electrolyte layer 6. If a concentration of the electrolytic compound in the solid electrolyte layer 6 is not sufficient, then there is a possibility that the ion conductivity is lowered. On the other hand, if the concentration is too high, then there is a possibility that an uneven dispersion state of the electrolytic compound is caused, resulting in lowering of a mechanical strength of the solid electrolyte layer 6. The concentration of the electrolytic compound preferably ranges from 0.1 to 80 mass %, and more preferably, ranges from 20 to 60 mass % with respect to the solid electrolyte layer 6.

To the solid electrolyte layer 6 composed of the polymer ion-conducting material, both of an intrinsic polymer electrolyte that does not substantially contain a solvent and a gel polymer electrolyte added with a plasticizer can be applied. As the plasticizer, ethylene carbonate, propylene carbonate, dimethyl carbonate, ethyl methyl carbonate, dimethyl carbonate, g-butyl lactone, methyl formate, methyl acetate, tetrahydrofuran and 1,2-dimethoxyethane can be exemplified. An added amount of the plasticizer is determined in accordance with required ion conductivity, which usually ranges from 40 to 90 mass %.

A material of the positive electrode 7 is selected in accordance with the type of the secondary battery, and is not particularly limited for constituting the present invention. For example, in the case of constituting the lithium polymer secondary battery, as the material of the positive electrode 7, lithium manganate ($LiMnO_2$, $LiMn_2O_4$), lithium cobaltate ($LiCoO_2$), lithium chromate ($Li_2Cr_2O_7$, $Li_2CrO_4$), lithium nickelate ($LiNiO_2$) and the like can be exemplified. Among them, lithium cobaltate, lithium nickelate and lithium manganate are preferable in consideration for advantages such as an output and durability.

The electron conducting layer 8 is interposed between the negative electrode 5 and the positive electrode 7, and plays a function of the electric conduction therebetween by giving/receiving electrons. The electric conduction is carried out not by the ion conduction but only by giving/receiving electrons. A material constituting the electron conducting layer 8 may be a material with the electron conductivity but without the ion conductivity, and is not particularly limited. As the material, metal such as stainless steel, nickel and titanium can be exemplified.

The constitution of the cell group 2 can be improved by combining a variety of publicly known arts as well as by adopting the constitutions exemplified as above. Moreover, also with regard to fabrication of the cell group 2, a fabrication method enabled by combining publicly known arts can be used. For example, the respective layers are stacked, pressed, and cut into a desired shape, thus making it possible to constitute the cell group 2.

The battery system 1 includes the heat mediating structures 3 adjacent to the above-described cell groups 2. In this specification, the term "adjacent" means that two things are in contact with each other without interposing a medium inhibiting the heat conduction therebetween. The heat mediating structures 3 have a function of heating the cell groups 2 by conducting the heat generated by the external heating means. Moreover, the heat mediating structure 3 may have a cooling function or have both heating and cooling functions. For example, this indicates that the heat mediating structures 3 are directly stacked on upper and/or lower surfaces of the cell groups 2 or that the heat mediating structures 3 and the cell groups 2 are brought into contact with each other by interposing thin films that are extremely good in heat conduction therebetween. In this embodiment, as shown in FIG. 2, each of the heat mediating structures 3 is a fluid path where a fluid heat medium flows, which is partitioned by walls 4. FIG. 2 shows the walls 4 formed in a wave plate shape, but the shape of the walls 4 is not limited to this. The shape of the walls 4 may adopt, for example, a honeycomb structure, and can be decided in consideration for a surface area, a mechanical strength, a shape, ease of fabrication and the like. The fluid flowing through the fluid path is a heat medium for heating or cooling the battery system and is flown in accordance with a using status of the battery. The heat medium may by any of gas and liquid, and water, air and the like can be exemplified. Preferably, the heat mediating structure 3 is formed to be thin in order to miniaturize the battery system. However, if the heat mediating structure 3 is too thin, then forming thereof will be difficult and the flowing of the heat medium will be difficult. In consideration for the above, a thickness of the heat mediating structure 3 preferably ranges about from 1 to 10 mm.

Each of the walls 4 constituting the heat mediating structures 3 is composed of metal such as aluminum in order to obtain good heat conductivity to enable rapid temperature control for the cell group 2. As a material of the wall 4, metal other than aluminum may be applied, and the one selected from the group consisting of electron-conductive materials. The applied material is properly selected, thus enabling heat control suitably. As an example of the applied metal, iron, stainless steel, copper, aluminum, nickel or the like can be enumerated. As an example of the good material in electron conductivity, polyacen, polyacetylene, poly-p-phenylene, polypyrrole, polyaniline and the like can be enumerated.

Each of the walls 4 constituting the heat mediating structures 3 can be composed of an insulating material. Since the solid electrolyte layer 6 of the present invention can be created by means of a printing technique, a large number of cell groups 2 can be easily arrayed. The arrayed cells can be further stacked to make it possible to constitute a large-capacity battery. The cell groups 2 are supported by the heat mediating structures 3. In the case of applying an insulating material for the heat mediating structures 3, since the insulating material does not short-circuit the adjacent electrodes, design can be made so that the electrodes cannot be set at an equal potential. As the insulating material, glass, alumina ceramics, steatite ceramics, silicon rubber, epoxy, Teflon, polyethylene, polypropylene, polyimide as a heat resistant resin and the like can be exemplified.

In the battery system 1 according to the present invention, since the cell groups 2 are composed of only the solid material as described above, it is not necessary to liquid-tightly seal the cell groups 2. Accordingly, each cell can be made thin to reduce the heat capacity. Furthermore, it is not necessary to accommodate the battery system 1 in a case, and the cell groups 2 can be directly heated or cooled by means of the above-described heat mediating structures, thus enabling the rapid temperature control. Moreover, in the case of arraying and stacking the large number of cell groups 2, the insulating material is applied for the heat mediating structures 3, thus eliminating a necessity of introducing other insulating means. Therefore, further miniaturization of the battery system can be achieved. In this case, a distance from the heat mediating structures 3 to the center of the cell groups 2 is increased as compared with the case where the cell group 2 is single, however, even in this case, no problem occurs for the rapid temperature control of each cell.

Figure 3:
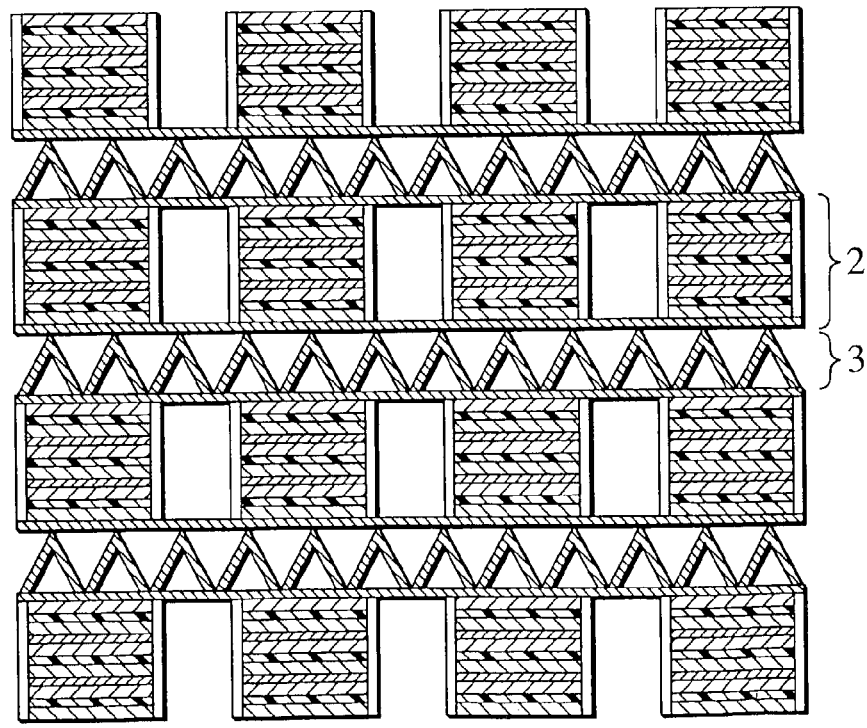
FIG. 3 is an enlarged cross-sectional view of a battery system according to a second embodiment of the present invention.

Description will be made for a battery system according to a second embodiment of the present invention with reference to FIG. 3. In FIG. 3, substantially the same constituent components as those of the first embodiment are referred to by the same reference numerals.

In this embodiment, a plurality of cell groups 2 provided with gaps there among are stacked by interposing heat mediating structures there among. By providing the gaps among the cell groups 2, a thermal stress is absorbed, and by flowing gas or liquid through the gaps, further rapid temperature control can be achieved.

Description will be made for a battery system according to a third embodiment of the present invention with reference to FIGS. 4A to 6C. In these figures, substantially the same constituent components as those of the first embodiment are referred to by the same reference numerals.

Figure 4A:
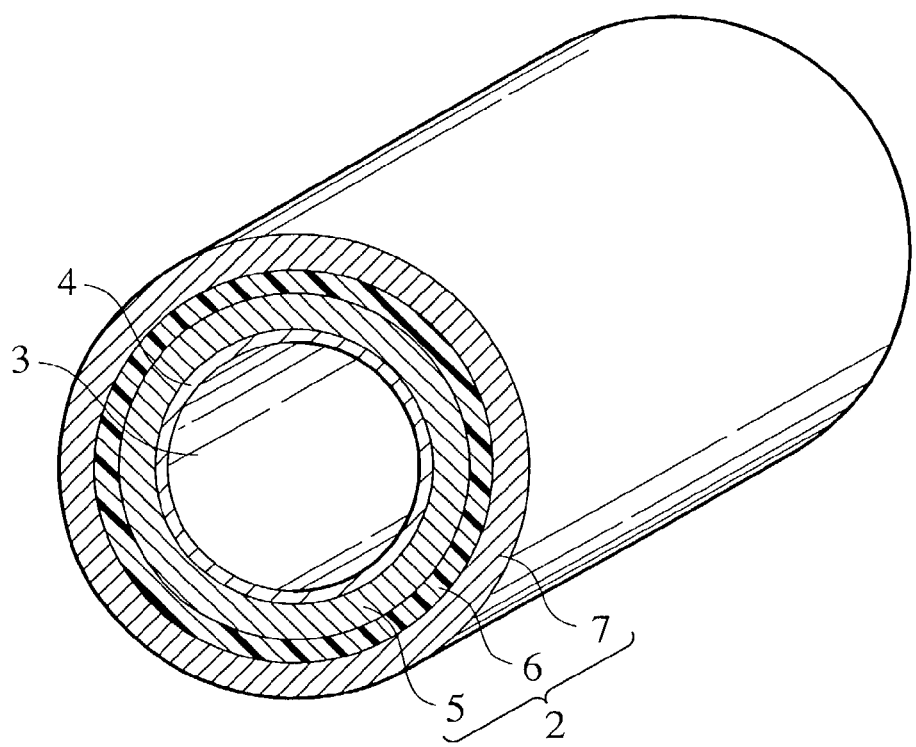
FIG. 4A is a cross-sectional perspective view of a battery system according to a third embodiment of the present invention.
Figure 4B:
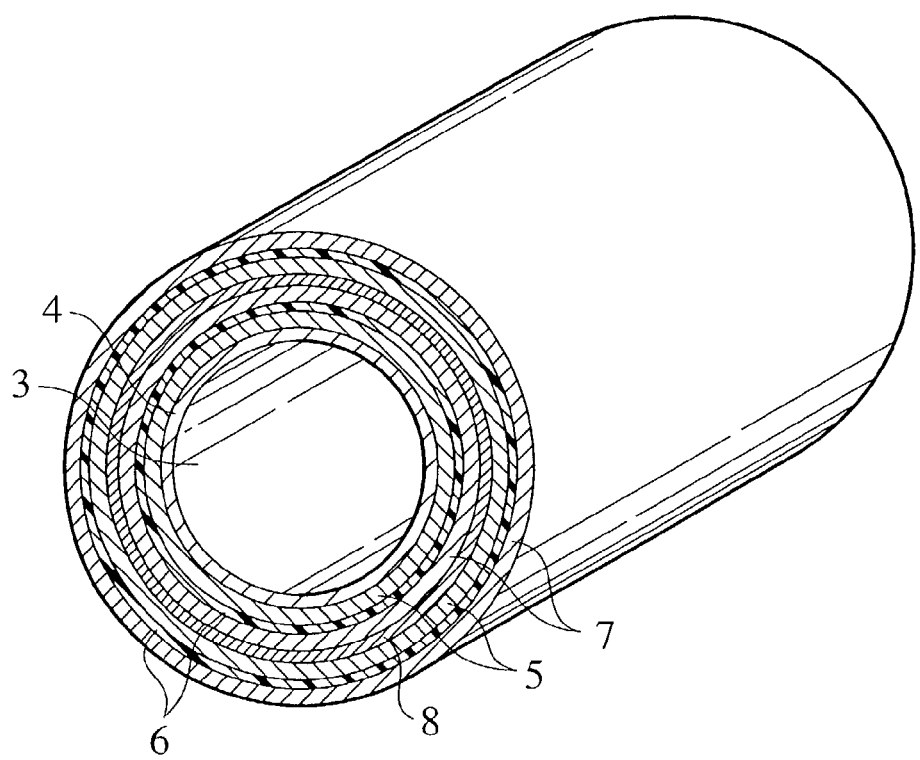
FIG. 4B is a cross-sectional perspective view of a battery system according to a first modification example of the third embodiment of the present invention.
Figure 5:
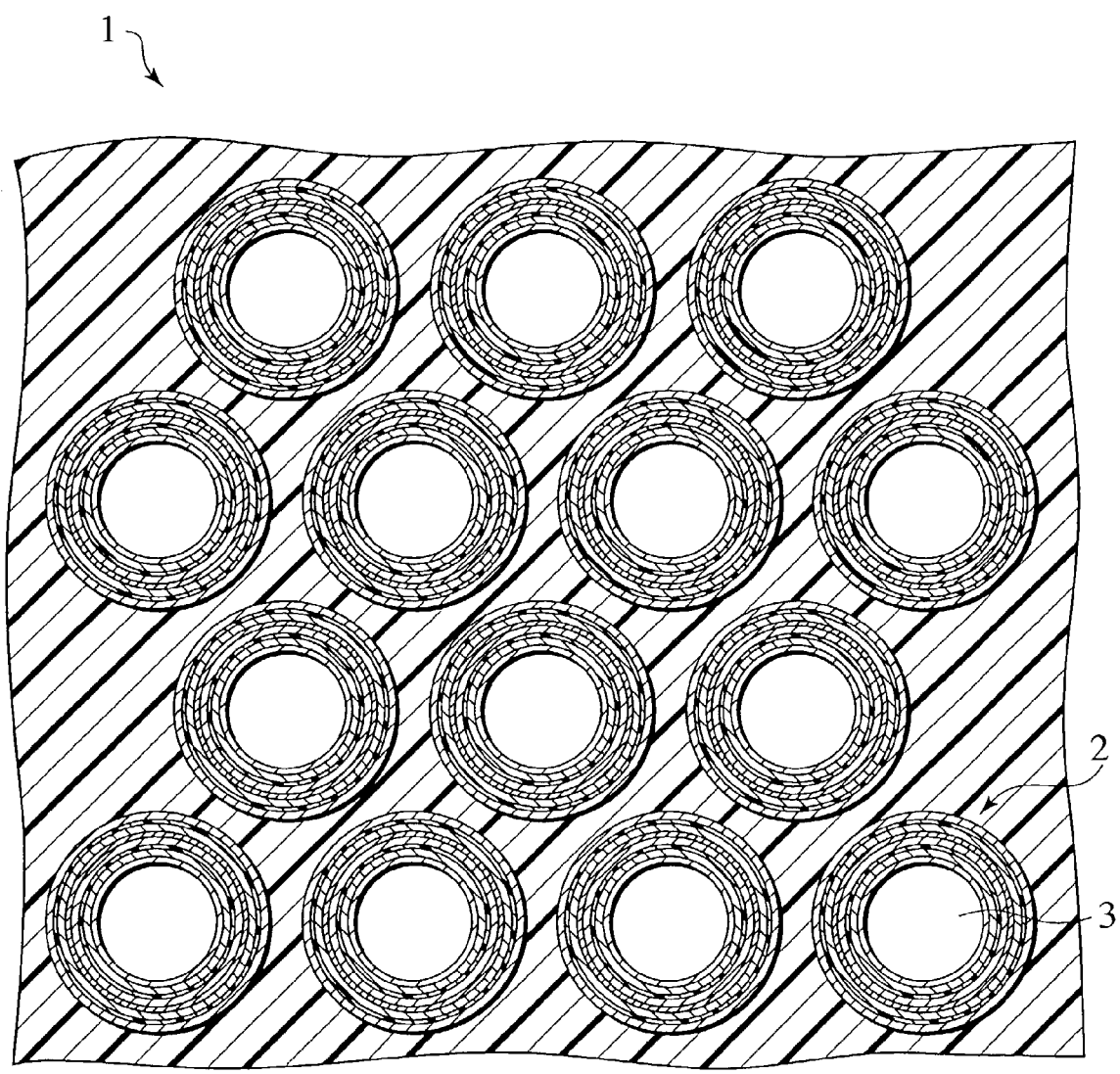
FIG. 5 is a cross-sectional view of a combination example of the battery systems according to the third embodiment of the present invention.

In this embodiment, as shown in FIG. 4A, a wall 4 is formed in a tube shape, and a cell group 2 is constituted to be adhered to a periphery of the wall 4 in a tube shape. The cell group 2 is formed on the periphery of the wall 4 by means of a method such as coating, dipping and spraying. As shown in FIG. 4B, the cell groups 2 may be stacked by interposing an electron conducting layer 8 therebetween. In this embodiment, as shown in FIG. 5, the cell groups 2 may be buried in other material to constitute the battery system 1. As a material in which the cell groups 2 are buried, polypropylene, polyethylene, urethane, polyimide and the like can be exemplified. The tube-shaped wall 4 can be composed of an electron-conductive material. In this case, the wall 4 can be allowed to function as a conductor for taking a current out of the battery.

Figure 6A:
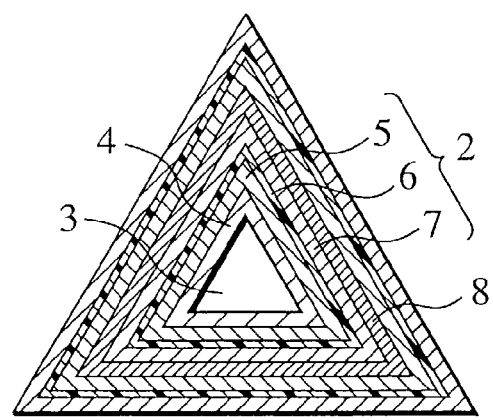
FIG. 6A is a cross-sectional view of a battery system according to a second modification example of the third embodiment of the present invention.
Figure 6B:
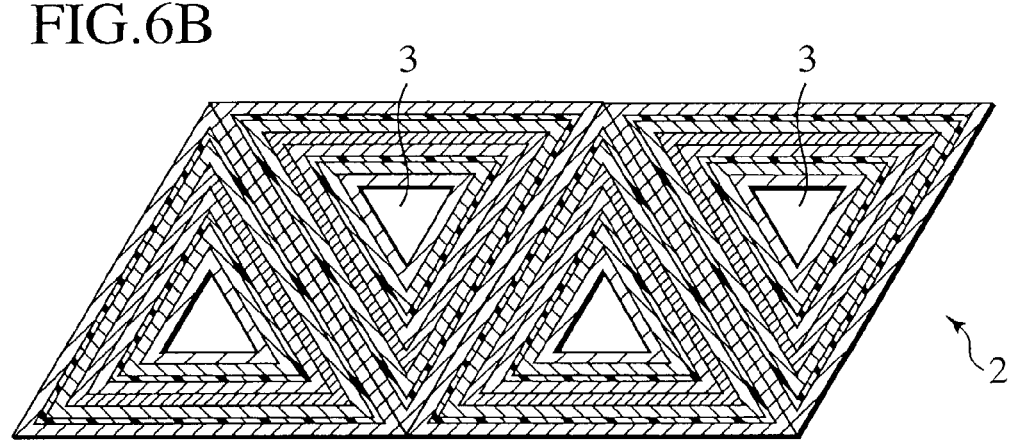
FIG. 6B is a cross-sectional view of a first combination example of the battery systems according to the second modification example of the third embodiment of the present invention.
Figure 6C:
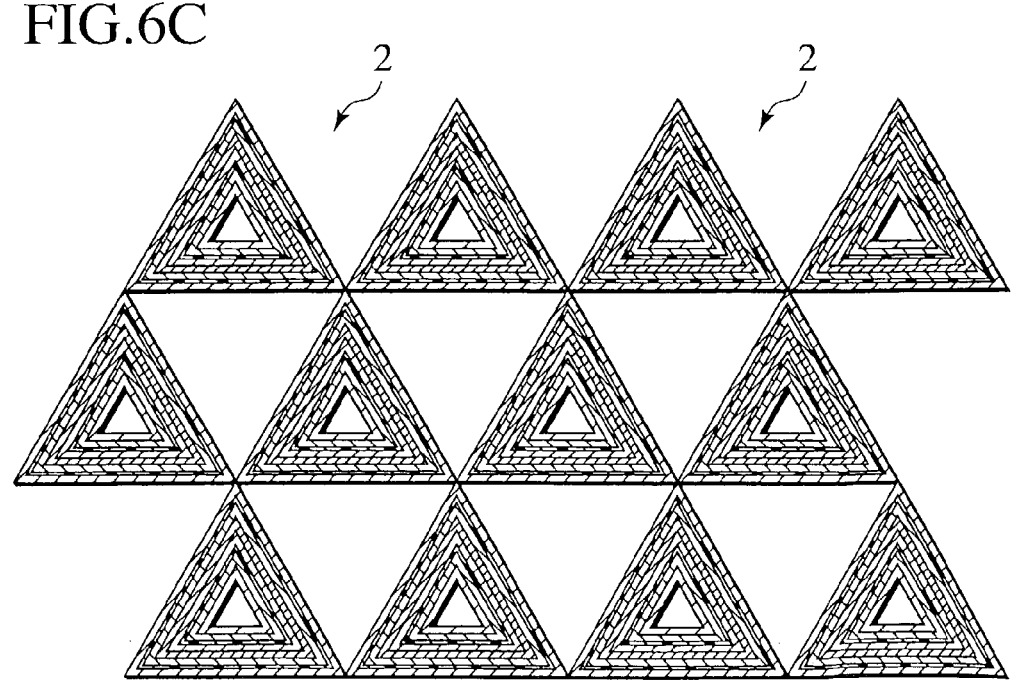
FIG. 6C is a cross-sectional view of a second combination example of the battery systems according to a third modification example of the third embodiment of the present invention.

As a cross-sectional shape of the tube-shaped wall 4, besides a circle as shown in FIGS. 4A and 4B, an oval, a triangle, a quadrangle, a polygon and the like can be adopted. The cross-sectional shape is properly selected in accordance with an environmental condition where the battery system 1 is disposed. FIG. 6A is an example where the cross section is a triangle. In the case of forming the cross section in a triangle, any constitution can be created, in which the battery systems 1 are combined without any gaps as shown in FIG. 6B, and in which the battery systems 1 are combined with gaps provided there among as shown in FIG. 6C.

Figure 7:
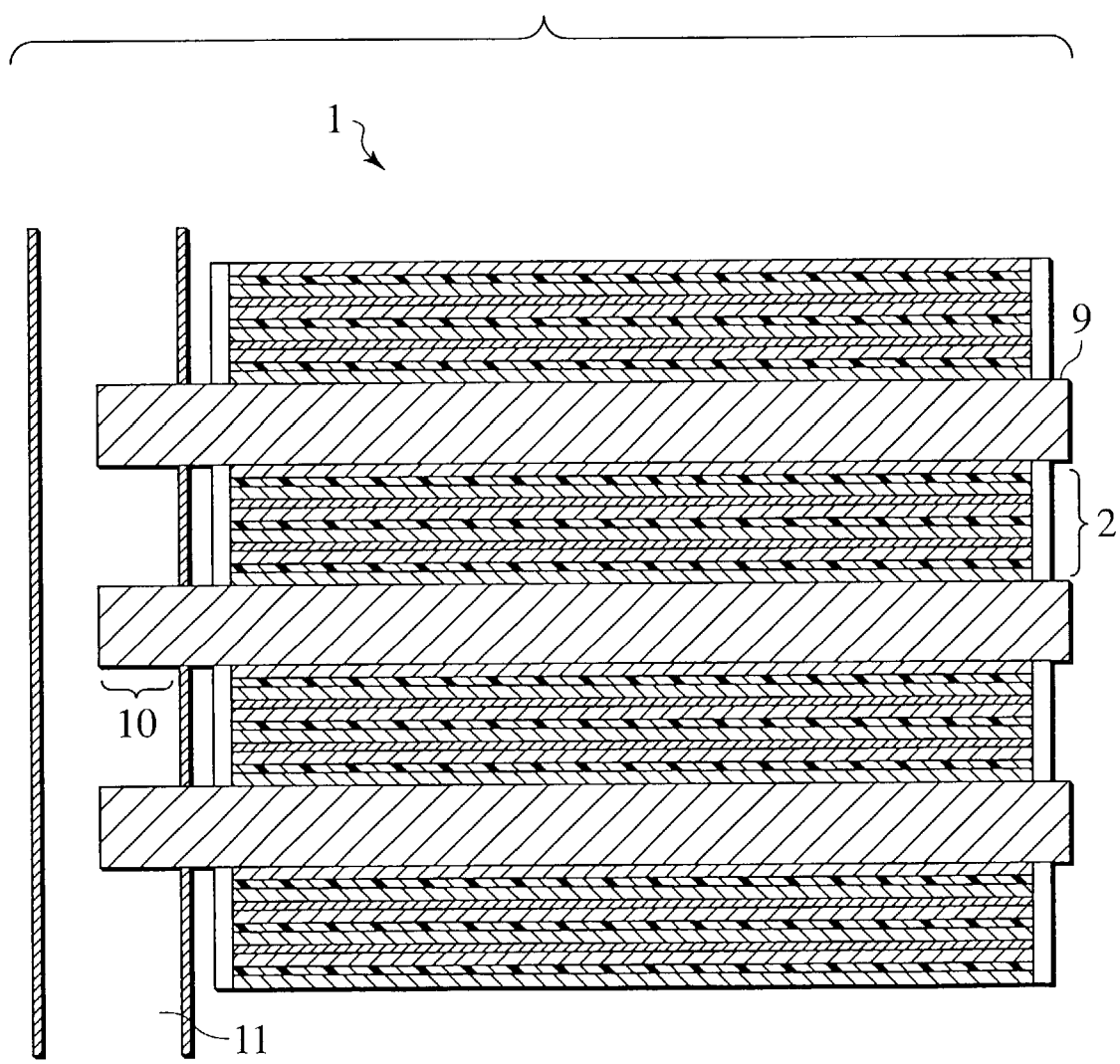
FIG. 7 is a cross-sectional view of a battery system according to a fourth embodiment of the present invention.

Description will be made for the third embodiment of the present invention with reference to FIG. 7. In FIG. 7, substantially the same constituent components as those of the first embodiment are referred to by the same reference numerals, and only constituent components different therefrom are denoted by new reference numerals.

The battery system 1 according to this embodiment includes solid heat mediating structures 9. Each of the solid heat mediating structures 9 partially protrudes to the inside of a fluid path 11, thus constituting a fin 10. The fin 10 is heated or cooled by heat medium passing through the fluid path 11, and transmits heat to the heat mediating structure 9. Since the heat mediating structure 9 is composed of a good heat conductor, the heat mediating structure 9 can control temperature of the cell groups 2 rapidly. In this embodiment, a distance of the heat medium and the cell is elongated more than the cases of the above-described embodiments. However, if the heat conductivity of the heat mediating structure is sufficiently large, then the temperature control is not delayed more than the cases of the above-described embodiments because the efficiency of the temperature control is decided depending on a heat transfer coefficient from the heat medium.

For the battery system of the present invention, a variety of disposition modes are conceived. Depending on the disposition modes, there may possibly be the case where it is difficult to supply the fluid to a main body of the battery system 1 due to a positional relationship thereof with a heat source for heating the battery system and peripheral equipment of the battery system. Even in such a case, the fluid may be supplied satisfactorily to the outside of the main body of the battery system 1 in this embodiment, thus improving a degree of freedom in design. This is a larger advantage in the case of applying the battery system to a vehicle having a complicated device configuration. As a shape of the fin 10, a variety of shapes such as a stick, a prism and a plate can be available. By increasing a surface area thereof, the heat conduction efficiency can be enhanced.

The heat conductor applied to the heat mediating structure 9 can be properly selected from publicly known good heat conductors, and may be selected in consideration for a disposition environment, an operation status, fabrication cost and the like. It is preferable to apply a material such as metal selected from the group consisting of aluminum, iron, copper and steel, which has an insulating layer formed on a surface thereof, silicon carbide, silicon nitride and the like. As the insulating layer formed on the metal surface, polypropylene, polyethylene, polyimide, polyurethane and the like can be exemplified, in which a layer having a thickness of about 0.02 to 2 mm is formed by means of a method such as painting.

Figure 8A:
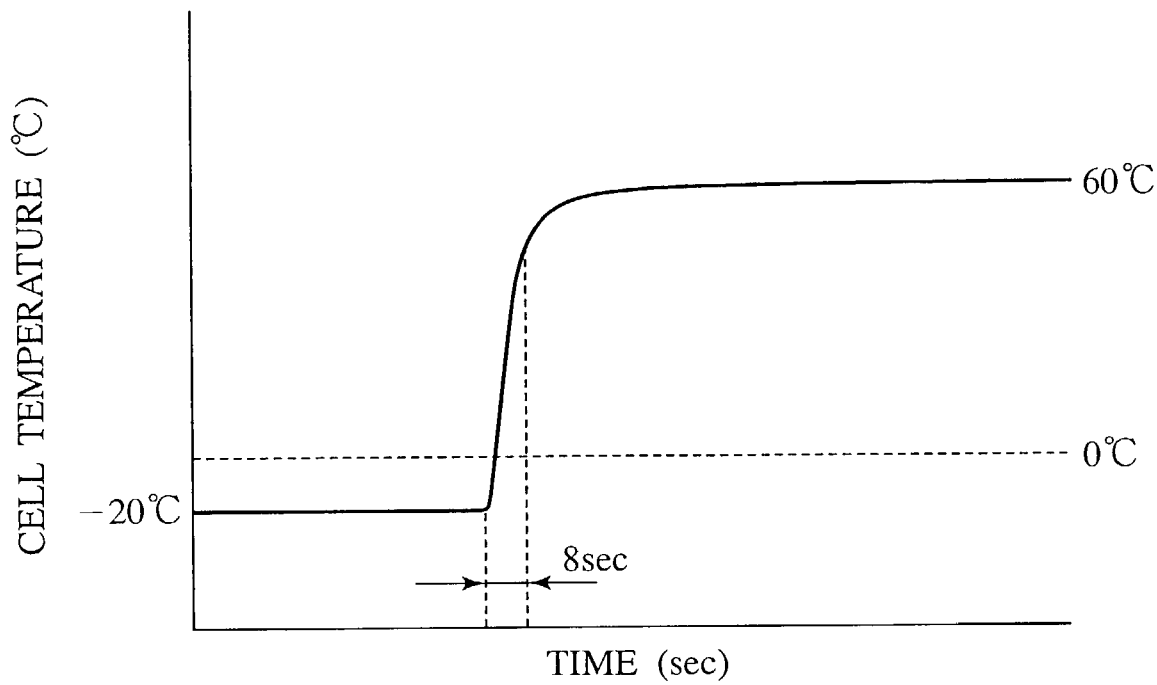
FIG. 8A is a view showing a time change of temperature in the battery system of the present invention.
Figure 8B:
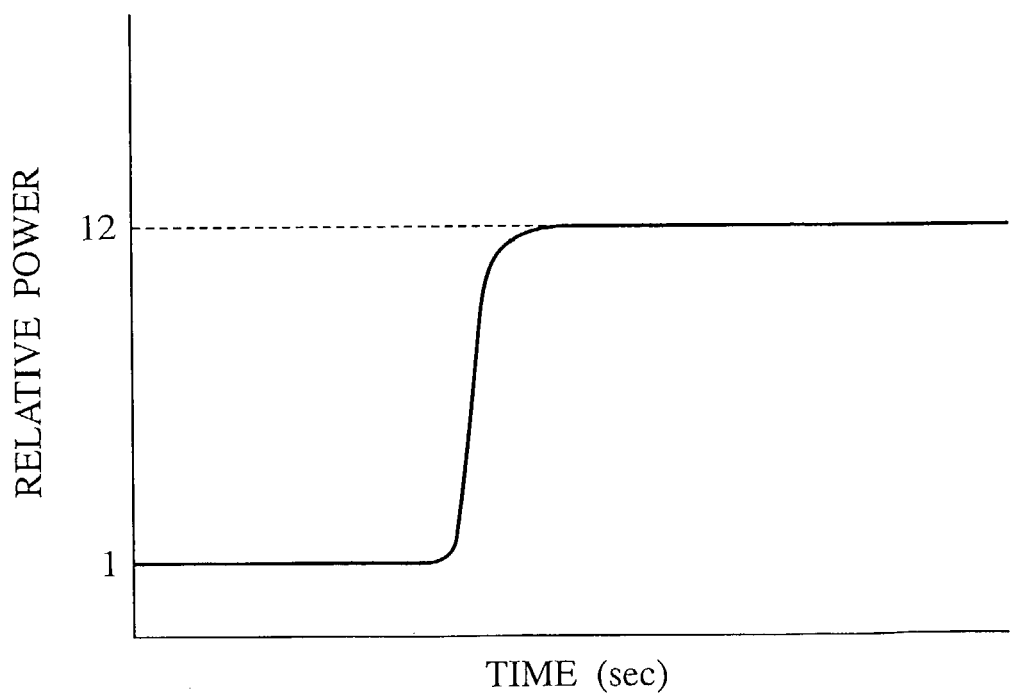
FIG. 8B is a view showing a time change of a battery output in the battery system of the present invention.

Next, description will be made for an example according to the present invention with reference to FIGS. 8A and 8B.

A unit cell consists of a positive electrode, which has a thickness of 20 mm and is composed of lithium manganate, a solid electrolyte layer, which has a thickness of 10 mm and is composed of ethylene-propylene copolymer, and a negative electrode, which has a thickness of 20 mm and is composed of lithium titanate. Twenty layers of the unit cells are stacked with electron conducting layers sandwiched there among, each having a thickness of 10 mm and being composed of titanium, thus constituting a cell having a thickness of 1.2 mm. A plurality of the cells are stacked by interposing heat mediating structures there among, thus fabricating the battery system of the first embodiment of the present invention.

The battery system is held under an atmosphere at −20° C. for a sufficient time, and thus temperature of the battery system is set at −20° C. Thereafter, air at temperature of 60° C. is introduced into the fluid path. FIG. 8A shows a temperature change of the battery system before and after the air introduction, and FIG. 8B shows a change of a battery output. In FIG. 8B, the change of the output is displayed as a ratio to a stable output (W) at −20° C., which is regarded as 1. Obviously, in an extremely short time, that is, in about 8 seconds after the air is introduced into the fluid path, the battery system can be heated up, and accompanied with this, the battery output can be rapidly increased.

The contents of Japanese Patent Application No. 2001-203358 (filed on Jul. 4, 2001) are incorporated herein by reference.

Although the preferred embodiments of the present invention have been described above, the present invention is not limited to the above-described embodiments. Based on the contents disclosed as above, those skilled in the art can embody the present invention by altering or modifying the embodiments. For example, the configuration of the cell or the heat mediating structure can be embodied by properly combining the publicly known arts.

What is claimed is:

1. A battery system, comprising:
   one or more cell groups, each including a positive electrode, a negative electrode and a solid electrolyte layer; and
   one or more heat mediating structures adjacent the cell groups, each of the heat mediating structures including a fluid path configured to conduct a fluid heat medium and a wave-like wall having angular tops and angular bottoms;
   wherein the cell groups and the heat mediating structures are alternately stacked, and
   wherein the heat mediating structures connect with external heating means.

2. The battery system according to claim 1, wherein:
   each of the fluid paths being composed of any of metals and conductors.

3. The battery system according to claim 1, wherein:
   each of the fluid paths being composed of an electrically insulating material.

4. The battery system according to claim 1, wherein:
   each of the heat mediating structures is composed of a solid material having heat conductivity.

5. The battery system according to claim 1, wherein:
   each of the heat mediating structures is composed of one or more materials selected from the group consisting of metals, silicon carbide and silicon nitride; and
   an interface of the heat mediating structure to the cell group includes an insulating layer.

6. The battery system according to claim 1, wherein:
   the solid electrolyte layer is composed of any of polymer ion-conducting materials and inorganic ion-conducting materials.

7. The battery system according to claim 1, wherein:
   a positive charge carrier in the solid electrolyte layer is lithium ions.

8. The battery system according to claim 1, wherein:
   the positive electrode is composed of any one or more of lithium cobaltate, lithium nickelate and lithium manganate.

9. The battery system according to claim 1, wherein:
   the negative electrode is composed of any one or more of graphite, hard carbon and lithium titanate.

10. The battery system according to claim 1, wherein the heat mediating structures are configured to circulate the fluid heat medium between the external heating means.

11. The battery system according to claim 1, wherein each of the cell groups comprises a plurality of cells, the cells being spaced and connected in parallel via the heat mediating structures.

12. The battery system according to claim 11, wherein the cell groups are buried in a resin.

* * * * *

UNITED STATES PATENT AND TRADEMARK OFFICE
CERTIFICATE OF CORRECTION

PATENT NO. : 7,264,902 B2  Page 1 of 1
APPLICATION NO. : 10/173612
DATED : September 4, 2007
INVENTOR(S) : Hideaki Horie et al.

It is certified that error appears in the above-identified patent and that said Letters Patent is hereby corrected as shown below:

On the title page

Item (56) References Cited, OTHER PUBLICATIONS, add
-- Japanese Office Action issued in corresponding Japanese Patent
Application No. JP 2001-203358, dated October 3, 2006 --

Signed and Sealed this

Eighteenth Day of December, 2007

JON W. DUDAS
*Director of the United States Patent and Trademark Office*